(12) United States Patent
Verbin et al.

(10) Patent No.: US 10,367,546 B2
(45) Date of Patent: Jul. 30, 2019

(54) COMMUNICATION METHOD AND SYSTEM ADAPTED FOR CONCURRENTLY OPERATING OVER A COMMUNICATION CHANNEL SUSCEPTIBLE TO CROSSTALK FROM AT LEAST A SECOND COMMUNICATION SYSTEM

(71) Applicant: Sckipio Technologies S.I LTD, Ramat Gan (IL)

(72) Inventors: Rami Verbin, Tel Aviv-Jaffa (IL); Amir Kanchuk, Ramat Gan (IL)

(73) Assignee: Sckipio Technologies S.I LTD, Ramat Gan (IL)

( * ) Notice: Subject to any disclaimer, the term of this patent is extended or adjusted under 35 U.S.C. 154(b) by 47 days.

(21) Appl. No.: 15/565,057

(22) PCT Filed: Apr. 8, 2016

(86) PCT No.: PCT/IL2016/050376
§ 371 (c)(1),
(2) Date: Oct. 6, 2017

(87) PCT Pub. No.: WO2016/162873
PCT Pub. Date: Oct. 13, 2016

(65) Prior Publication Data
US 2018/0091190 A1    Mar. 29, 2018

Related U.S. Application Data

(60) Provisional application No. 62/144,938, filed on Apr. 9, 2015, provisional application No. 62/319,309, filed on Apr. 7, 2016.

(51) Int. Cl.
*H04B 3/32*    (2006.01)
*H04L 25/02*    (2006.01)
(Continued)

(52) U.S. Cl.
CPC ............... *H04B 3/32* (2013.01); *H04B 3/487* (2015.01); *H04L 5/14* (2013.01); *H04L 25/0264* (2013.01);
(Continued)

(58) Field of Classification Search
CPC .. H04B 3/32; H04L 25/02; H04L 5/14; H04L 27/34
See application file for complete search history.

(56) References Cited

U.S. PATENT DOCUMENTS

| 6,339,613 | B2 | 1/2002 | Terry | |
| 7,649,973 | B1* | 1/2010 | Li | A61B 6/032 378/9 |

(Continued)

FOREIGN PATENT DOCUMENTS

| WO | 2015030817 A1 | 3/2015 |
| WO | 2016162873 A1 | 10/2016 |

OTHER PUBLICATIONS

"Coexistence Analysis of Asynchronous Digital Subscriber Lines with Different Sampling Rate and Carrier Frequency Spacing", Sanda Drakuli, Martin Wolkerstorfer, and Driton Statovci, FTW Telecommunications Research Center Vienna, Donau-City-Straße 1, A-1220 Vienna, Austria, Globecom 2014—Symposium on Selected Areas in Communications: GC14 SAC Access Networks and Systems (6 Pages).

(Continued)

*Primary Examiner* — Xavier Szewai Wong
(74) *Attorney, Agent, or Firm* — Brown Rudnick LLP (57) ABSTRACT

A communication system operative for transmitting over a communication channel. The communication channel being susceptible to crosstalk from at least a second communication system different from the communication system. The communication system includes at least one transceiver pair.

(Continued)

At least the a first transceiver of the transceiver pair includes a first analog from end and a first shaping filter coupled with the analog front end. The first analog front end at least includes a programmable gain amplifier. The attenuation of the first shaping filter in the overlapping frequency range is higher than the attenuation in the non-overlapping frequency range.

13 Claims, 5 Drawing Sheets

(51) Int. Cl.
    *H04L 5/14*     (2006.01)
    *H04L 27/34*     (2006.01)
    *H04B 3/487*     (2015.01)
    *H04M 11/06*     (2006.01)

(52) U.S. Cl.
    CPC .......... *H04L 27/3405* (2013.01); *H04L 27/34* (2013.01); *H04M 11/06* (2013.01)

(56) References Cited

U.S. PATENT DOCUMENTS

| | | | |
|---|---|---|---|
| 8,180,017 B2* | 5/2012 | Forthmann | A61B 6/032 378/156 |
| 8,275,026 B2 | 9/2012 | Lee | |
| 8,537,912 B2 | 9/2013 | Long et al. | |
| 8,817,903 B2 | 8/2014 | Nuzman | |
| 2003/0108095 A1 | 6/2003 | Duvaut et al. | |
| 2007/0004343 A1* | 1/2007 | Kandola | H03F 1/0222 455/73 |
| 2008/0159415 A1* | 7/2008 | Miller | H04L 25/0266 375/258 |
| 2010/0278536 A1* | 11/2010 | Mak | H04L 25/022 398/79 |
| 2013/0294597 A1* | 11/2013 | Shi | H04L 7/0041 379/406.01 |
| 2014/0161000 A1* | 6/2014 | Fazlollahi | H04B 3/32 370/280 |
| 2015/0237626 A1* | 8/2015 | Li | H04W 72/0446 370/280 |
| 2015/0270942 A1* | 9/2015 | Sorbara | H04L 5/143 370/295 |
| 2016/0049990 A1* | 2/2016 | Lv | H04B 3/32 370/201 |
| 2016/0105215 A1* | 4/2016 | Wang | H04B 3/32 370/201 |

OTHER PUBLICATIONS

"Coexistence of G.Fast and VDSL in FTTDP and FTTC Deployments", Rainer Strobel, Wolfgang Utschick, 23rd European Signal Processing Conference (EUSIPCO), Lantiq, pp. 1108-1112 (5 Pages).
"Fast access to subscriber terminals (G.fast)—Power spectral density specification". 1-13 ITU-T. , Dec. 19, 2014, Retrieved http://www.itu.intlrec/T-REC-G.9700-201404-I1 en> ITU-T, Dec. 19, 2016 (22 Pages).
"G.fast Technology and the FTTdp Network", Rainer Strobel, Lantiq, Whitepaper, Oct. 2014, pp. 1-24.
"G.fast: Deployment Scenarios Challenges & Opportunities", Dr. Debajyoti Pal, Senior VP & CTO, Ikanos Communications Inc. (20 Pages).
"Realization of adaptive NEXT canceller for ADSL on DSP kit", In Proceedings of the 5th 1-13 WSEAS international conference on Data networks, Communications and computers (pp. 36-41). World Scientific and Engineering Academy and Society (WSEAS). (Retrieved from the internet on Jul. 27, 2016). Retrieved from: http://www.wseas.us/e-library/conferences/2006bucharest/papers/5 18-272., Uma, B.V et al., Oct. 16, 2006 (6 Pages).
International Search Report and Written Opinion of the International Search Authority dated Aug. 2, 2016 for International Application No. PCT/IL2016/050376 (7 Pages).
Extended European Search Report dated Oct. 9, 2018 for European Application No. 16776228.5 (10 Pages).
Lantiq, Vladimir Oksman, "G.fast, G.vds12: Performance of G.fast for extended reach; TD2015-01-04-034", ITU-T Draft; Study Period 2013-2016, International Telecommunication Union, vol. 4/15, Feb. 12, 2015 (8 Pages).

\* cited by examiner

COMMUNICATION METHOD AND SYSTEM ADAPTED FOR CONCURRENTLY OPERATING OVER A COMMUNICATION CHANNEL SUSCEPTIBLE TO CROSSTALK FROM AT LEAST A SECOND COMMUNICATION SYSTEM

FIELD OF THE DISCLOSED TECHNIQUE

The disclosed technique relates to communications in general, and to communication methods and systems adapted for concurrently operating over a communication channel susceptible to crosstalk from at least a second communication system, in particular.

BACKGROUND OF THE DISCLOSED TECHNIQUE

The "last mile" is a phrase in telecommunications, cable television and internet industries relating to the connection of retail customers (e.g., homes or offices) to the pertinent network (e.g., the telephone network or the internet). The "last mile" connections typically exhibit a bandwidth "bottleneck" limiting the rate of data delivery to the customers. Furthermore, "last mile" connections are expensive to upgrade due to the large number of such connections (i.e., relative to the number of connections between exchanges or routers).

The xDSL standards, and in particular the G.fast standard, utilize the legacy copper infrastructure to provide high bandwidth communication services. "G.Fast" technology attempts to increase the data rate between the distribution point and the Customer Premise Equipment (CPE) (e.g., such as modems, routers, hubs, computers, Smart TV's and the like) to the order of one Giga bits per second (i.e., 1 Gbps). Typically, the bandwidth of each twisted pair is between 100-200 Megahertz (MHz). The signals are transmitted over copper twisted pairs are arranged in a hierarchical order. Pairs or quad lines accumulate to 25 pairs binder, which in turn accumulate to 50 pairs, 100 pairs 300 pairs and so on. As a result of the binding of the twisted pairs and the high frequencies employed, a high degree of crosstalk interference exists between the different twisted pairs in the binder. In essence, due to the high level of crosstalk, the coupling between the distribution point and different CPE may be considered as a multiple access problem, where a plurality of devices are coupled with the plurality of CPE's. Such a coupling or channel may be described in a matrix form where the entries in the matrix represent the different coupling factors.

Data transmission includes downstream transmission of data from the DP toward the CPE also referred to as downlink (DL). Data transmission also includes upstream transmission of data from the CPE toward the DP also referred to as uplink (UL). In legacy xDSL standards (e.g., ADSL or VDSL), the DL and the UL are frequency duplexed (i.e., a portion of the channel bandwidth is dedicated for DL and another portion is dedicated for UL). For example, Very-high-bit-rate Digital Subscriber Line (VDSL) is a Digital Subscriber Line (DSL) technology providing data transmission over a single flat untwisted or twisted pair of copper wires in which the DL and the UL are frequency duplexed.

In general, a G.Fast communication system employs Discrete Multi-Tone (DMT) where the available band width is divided into a plurality of sub-channels and determines the modulation scheme for each sub-channel (e.g., Quadrature Amplitude Modulation—QAM) such that the data transmission rate is maximized. In G.Fast, the DL and UL are time duplexed. The data transmission is divided into data frames, where each frame includes a plurality of time-slots each for transmitting data symbols (i.e., a combination of bits is transmitted in each time-slot) over the different sub-channels. Nevertheless, the terms 'time-slot' and 'symbol' are used herein interchangeably. In each frame, a portion of the symbols may be designated for downlink transmission and a portion of the symbols may be designated for uplink transmission. Frames may further be grouped in superframes, where each super-frame includes a plurality (e.g., one the order of tens) of frames.

Figure 1:
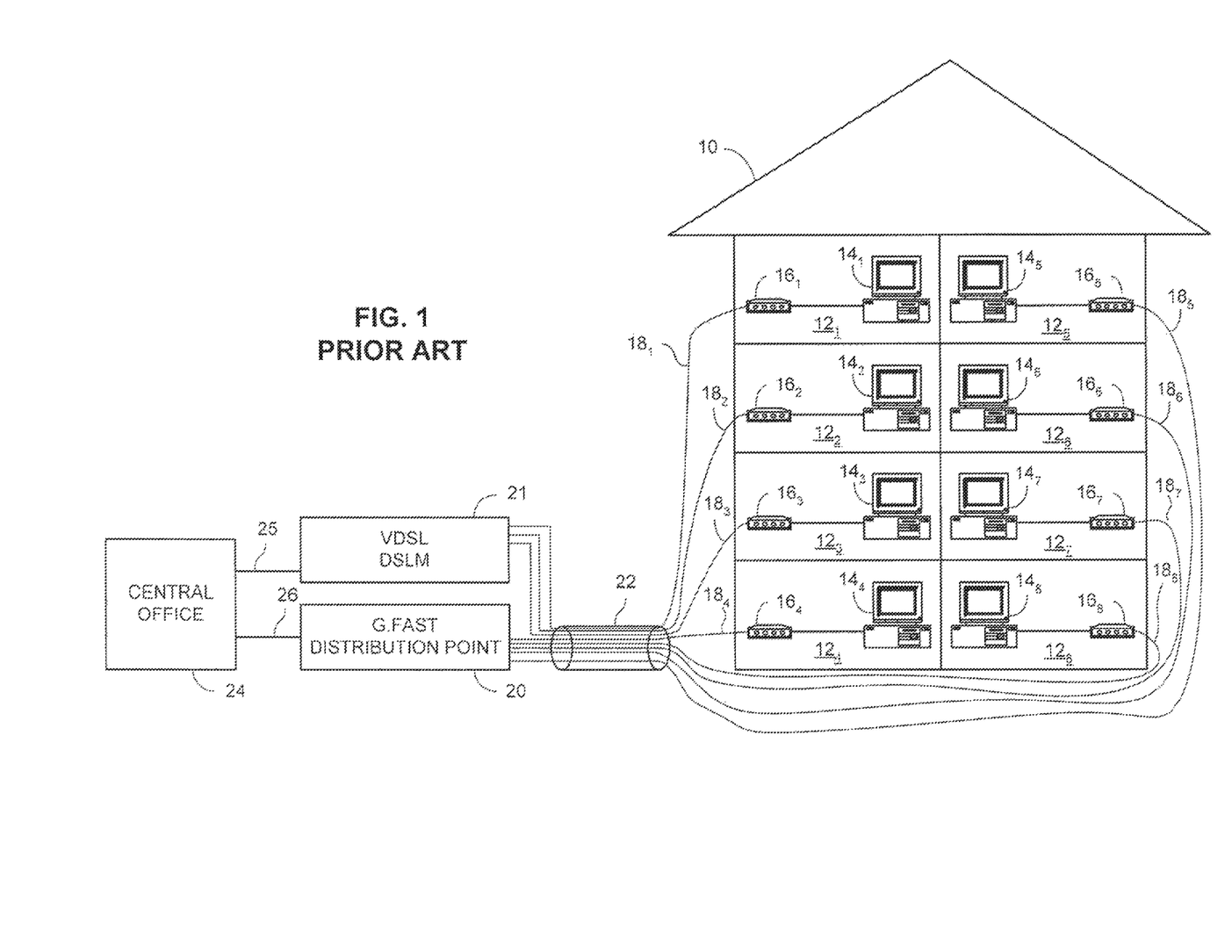
FIG. 1 is a schematic illustration of an exemplary "last mile" connection in which a VDSL system and a G.Fast system share common copper infrastructure, which is known in the art.

Reference is now made to FIG. 1, which is a schematic illustration of an exemplary "last mile" connection in which a VDSL system and a G.Fast system share common copper infrastructure, which is known in the art. Such a typical "last mile" connection includes a building 10 G.Fast distribution point 20, VDSL Digital Subscriber Line Access Multiplexer (DSLAM) 21, and a central office 24. Building 10 includes, for example, eight apartments $12_1$-$12_8$. Each of apartments $12_1$-$12_8$ includes, for example, a respective one of computers $14_1$-$14_8$ coupled with a respective one of modems $16_1$-$16_8$ either directly or via a router or hub (not shown).

Each one of modems $16_1$-$16_3$ is coupled with VDSL DSLAM 21 via a respective one of line connections $18_1$-$18_3$. Each one of modems $16_4$-$16_8$ is coupled with G.Fast distribution point 20 via a respective one of line connections $18_4$-$18_8$. Line connections $18_1$-$18_8$ are also known as "drops". Each one of line connections $18_1$-$18_8$ is, for example, a twisted pair of wires. Each one of line connections $18_1$-$18_8$ may further be, for example, a coaxial cable. Line connections $18_1$-$18_8$ are grouped together within a binder 22. G.Fast distribution point 20 along with line connections $18_3$-$18_8$, modems $16_4$-$16_8$ and computers $14_3$-$14_8$ constitute a G.Fast communication system. G.Fast distribution point 20 is coupled with Central office 24 via a communication channel 26 (e.g., optical cable, wireless channel). The distance between building 10 and distribution point 20 is up to the order of hundreds of meters and typically up to 200 meters. The distance between distribution point 20 and central office 24 is up to the order of several kilometers. VDSL DSLAM 21 along with line connections $18_1$-$18_3$, modems $16_1$-$16_3$ and computers $14_1$-$14_2$ constitute a VDSL communication system. VDSL DSLAM 21 is coupled with Central office 24 via a communication channel 25 (e.g., optical cable, wireless channel). The distance between building 10 and VDLS DSLAM 21 is up to the order of one Kilometer. The distance between VDSL DSLAM 21 and central office 24 is up to the order of several kilometers.

It is noted that computers $14_1$-$14_8$ are brought herein as an example only. Other devices require communication services (e.g., smart TV's, smartphones, IP phones, routers) may be coupled with the respective one of modems $16_1$-$16_8$. Furthermore, building 10 may include offices rather than apartments. Additionally, the number of apartments or offices in building 10 may be different than eight (e.g. four, sixteen or twenty four). Additionally or alternatively, G.Fast distribution point 20 and VDSL DSLAM may each be connected to a plurality of private homes.

G.fast employs Time Division Duplexing (TDD) technology. It utilizes the band from 2 MHz to 106 MHz, and is intended to be deployed in an environment where VDSL is already deployed. VDSL (Very-high-bit-rate Digital Subscriber Line) is a Digital Subscriber Line (DSL) technology providing data transmission over a single flat untwisted or twisted pair of copper wires and employs the frequency range up to 17.6 MHz or 30 MHz, depending on the profile deployed. The upstream/downstream transmissions are zipped in predefined frequency bands, as illustrated in Table 1 which follows:

TABLE 1

| Frequency [MHz] | <3.75 | 3.75-5.2 | 5.2-8.5 | 8.5-12 | 12-17.6 |
|---|---|---|---|---|---|
| Down/Up | Down | Up | Down | Up | Down |

Figure 2:
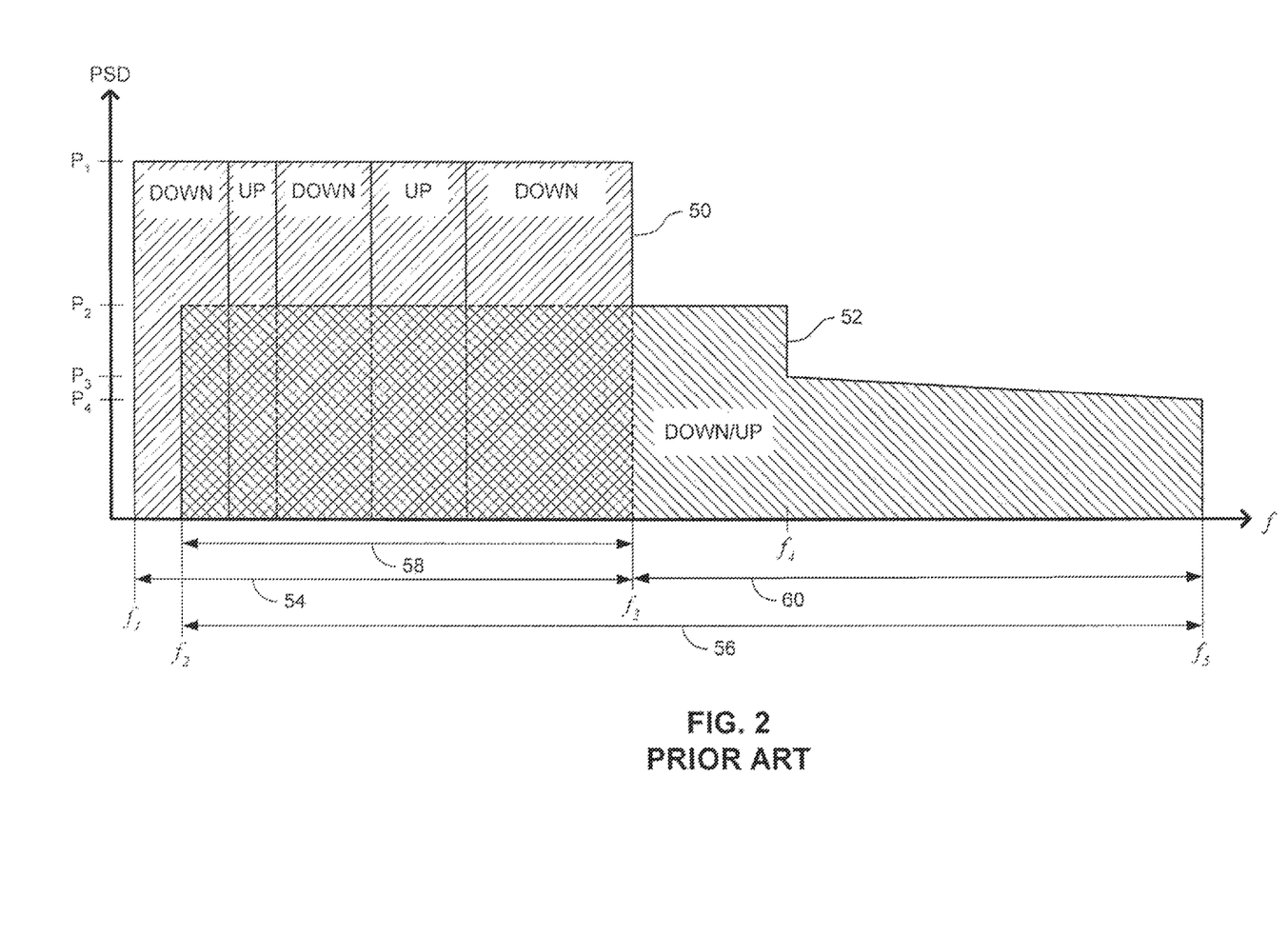
FIG. 2 is a schematic illustration of the VDSL spectral mask and the G.Fast spectral mask, which is known in the art.

Reference is now made FIG. 2, which is a schematic illustration of the VDSL spectral mask 50 and the G.Fast spectral mask 54, which is known in the art. VDSL spectral mask 50 extends over the frequency range 54 between frequencies (e.g., 64 Kilohertz) and $f_3$ (e.g., 17.6 Megahertz). G.Fast spectral mask 52 extends over the frequency range 56 between extends between frequencies $f_2$ (e.g., 2 Megahertz) and $f_5$ (e.g., 106 Megahertz). VDSL spectral mask 50 allows for transmission at a power level of P1 (e.g., −58 dBm). G.Fast spectral mask 52 allows for transmission at a power lever of P2 (e.g., −65 dBm) between frequency $f_1$ and frequency and for a decreasing transmission power between P3 and P4 between frequency $f_4$ and frequency $f_5$. Frequency $f_4$ shall also be referred to herein as the 'mask transition frequency'. In general, P1>P2>P3>P4. As depicted in FIG. 1, frequency range 54 of VDSL spectral mask 50 overlaps with frequency range 56 of G.Fast spectral mask 52 over frequency range 58 between frequency $f_2$ and frequency $f_3$. Frequency range 58 is also referred to herein as the 'overlapping frequency range'. Frequency range 60 is referred to herein as the 'non-overlapping frequency range'.

Due to the density of systems and the close physical proximity therebetween, a new communication system, such as G.Fast, that is introduced to the copper infrastructure (plant), where pervious communication systems (e.g., VDSL) exist, may suffer from cross-talk as well as from signal attenuation which increases with frequency (i.e., low pass characteristics). The Analog Front End (AFE) of the new system is typically designed the receiver such that it supports the worst case scenario, that is, being able to process the highest attenuation at the highest frequency.

A known in the art technique for employing G.Fast where VDSL is already installed, also referred to herein as 'the coexistence problem', is frequency separation, in which VDSL employs the frequencies allocated thereto while G.fast employs only the frequencies above the VDSL band (i.e., between $f_3$ and $f_5$ in FIG. 2). In practice, according to the examples brought forth above, since guard band may be needed between the end of the VDSL transmission band and the start of the G.Fast transmission band, G.Fast transmission shall only starts above the high cutoff frequency of VDSL transmission (e.g., 8 Megahertz, 12 Megahertz at 20 Megahertz 23 Megahertz or 30 Megahertz). This may result in loss of G.Fast data rates (i.e., also referred to herein as 'capacity'). This loss of capacity is mostly prominent in long lines where the higher frequencies may suffer from higher attenuation than the lower frequencies and may not carry any data.

SUMMARY OF THE PRESENT DISCLOSED TECHNIQUE

It is an object of the disclosed technique to provide a novel for communication methods and systems adapted for operating over a communication channel susceptible to crosstalk from at least a second communication system. In accordance with the disclosed technique, there is thus provided a communication system operative for transmitting over a communication channel, the communication channel being susceptible to crosstalk from at least a second communication system different from said communication system. The communication system includes at least one transceiver pair. At least a first transceiver of the transceiver pair includes a first analog front end and a first shaping filter coupled with the analog front end. The first analog front end at least includes a programmable gain amplifier. The attenuation of the first shaping filter in the overlapping frequency range is higher than the attenuation in the non-overlapping frequency range.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a communication methods and systems adapted for operating over a communication channel susceptible to crosstalk due to at least partial frequency spectrum overlap by at least a second communication system different from the communication system.

The disclosed technique is specifically applicable where the G.Fast transceivers are deployed in an environment where a VDSL communication system is already installed. A special case is when either the deployed VDSL communication system does not implement vectoring (i.e. a crosstalk cancellation technique) or the G.Fast loop length (i.e., the distance between the distribution point and the CPE) is relatively long (e.g., on the order of hundreds of meters) or both. Other applicable scenarios may also be relevant where two technologies share the same binder and spectrum. Nevertheless the disclosure herein relates to the example of G.Fast and VDSL communication system.

A communication system according to the disclosed technique may employ either the entire frequency spectrum thereof (i.e., regardless if a second communications system is active or in-active), referred to herein as "overlapping mode", or just the non-overlapping frequencies (e.g., where regulatory or coexistence constraints prohibit the use of the overlapping frequencies) referred to herein as "non-overlapping mode". In the overlapping mode, the frequency spectrum employed by the G.Fast system includes at least a portion of the overlapping frequencies. The non-overlapping mode may be dynamic (i.e., "dynamic non-overlapping mode"). In other words, when the second communication system decreases or increases the frequency spectrum thereof, the communication system according to the disclosed technique increases or decreases the frequency spectrum thereof respectively. The term 'active' herein above and below relates to a communication system which transmits symbols over the communication channel thereof. The term 'in-active' or 'not-active' herein above and below relates to a communication system which at least does not transmit symbols over the communication channel thereof and my further be powered off.

When a G.Fast communication system operates in an environment where a VDSL communication system may be active, the G.Fast channel is susceptible to cross-talk from the VDSL channel and vice versa. Typically, near end cross-talk (i.e., NEXT) from the VDSL system into the G.Fast system may be more dominant than the received G.Fast signal. In general, the VDSL signals exhibit a higher power level than the G.Fast signals. Thus, since a G.Fast communication system employs Automatic Gain Control, the cross-talk of VDSL signals into the G.Fast channel may require reducing the gain at the G.Fast receiver (i.e., regardless of whether the spectrum of the two communication systems overlap or not), which may result in lower Signal to Noise Ratio (SNR) levels (i.e., relative to when VDSL is not installed). A lower SNR degrades the G.Fast system performance (e.g., bit-rate, Bit Error Rate—BER and the like). Furthermore, overlapping spectrum ranges of the VDSL and the G.Fast communication systems may result in a high NEXT level injected from G.Fast into VDSL. This may result in a lower SNR at the VDSL receiver and degradation in performance of an already deployed technology. This may not be acceptable by regulatory bodies or VDSL service providers, specifically if the VDSL communication system implements vectoring.

According to the disclosed technique, a G.Fast communication system (i.e., when operating in either the overlapping or non-overlapping modes) employs a "shaping filter" in the G.Fast receivers (i.e., either in the G.Fast DP, at the G.Fast CPE or both). The attenuation of this shaping filter in the low frequencies (and thus in the potentially overlapping frequency range when operating in the overlapping mode) of the received G.Fast signal (i.e., which may include crosstalk from a VDSL signal) is higher than the attenuation in the high frequency range as further explained below. Thus, the VDSL signals, which exhibit a higher power relative to the G.Fast signals, are attenuated and the G.Fast receiver does not need to reduce the gain thereof. Since the G.Fast spectral mask allows for higher transmission power at the low frequencies than the transmission power at the high frequencies, and since the G.Fast channel exhibits low pass characteristics, the shaping filter can be employed without affecting the G.Fast signal transmission power. The shaping filter may also be employed for pre-conditioning regardless if VDSL cross-talk exists or not as further explained below.

Also according to the disclosed technique, when the VDSL system does not employ vectoring, the VDSL downstream frequencies may be employed for both VDSL and G.Fast transmission. Since the power of the G.Fast signal is lower than the power of the VDSL signal, the Far End Crosstalk (FEXT) caused by the G.Fast signal shall result in FEXT power level at a VDSL receiver, which is lower than the FEXT power level produced by other VDSL transmitters. Thus, the G.Fast signal does not interfere with VDSL transmission and reception. As such, the G.Fast transmitter may transmit a signal at the highest possible level (i.e., as allowed by standard or regulation), without interfering with VDSL signals, thus improving the SNR of the G.Fast signal.

In general, since a G.Fast communication system employs TDD, the statistical characteristics of the signals in the G.Fast channel are non-stationary (e.g., exhibits different statistical moments over time). Accordingly, to reduce the FEXT introduced by the G.Fast signals into the VDSL signals, the G.Fast DL/UL ratio may be determined such that the cross-talk from G.Fast signals into VDSL signals exhibit substantially stationary statistical characteristics (i.e., quasi-stationary cross-talk statistics). (e.g., 90% of the G.Fast TDD frame is employed for downlink transmission). Thus, the G.Fast frame is allocated for downstream transmissions, the G.Fast signal exhibits substantially stationary statistical characteristics. Thus, the error introduced by the G.Fast FEXT, to the noise or SNR estimation performed by the VDSL downstream receiver, is minimal. For example, the difference between the average noise level measured by the VDSL downstream receiver and the worst case noise level is on the order of 0.5 dB. Different DL/UL ratios may be employed (i.e., less than 90%) but the VDSL transceiver should allow for the lower SNR estimation such employ higher noise margin or adding virtual noise.

Furthermore, the G.Fast communication system employs the VDSL downstream frequency bands during downstream transmission while refraining from employing the VDSL upstream frequency bands. Conversely, the G.Fast communication system may employ the VDSL upstream frequency bands during upstream transmission while refraining from employing the VDSL downstream frequency bands.

Figure 3:
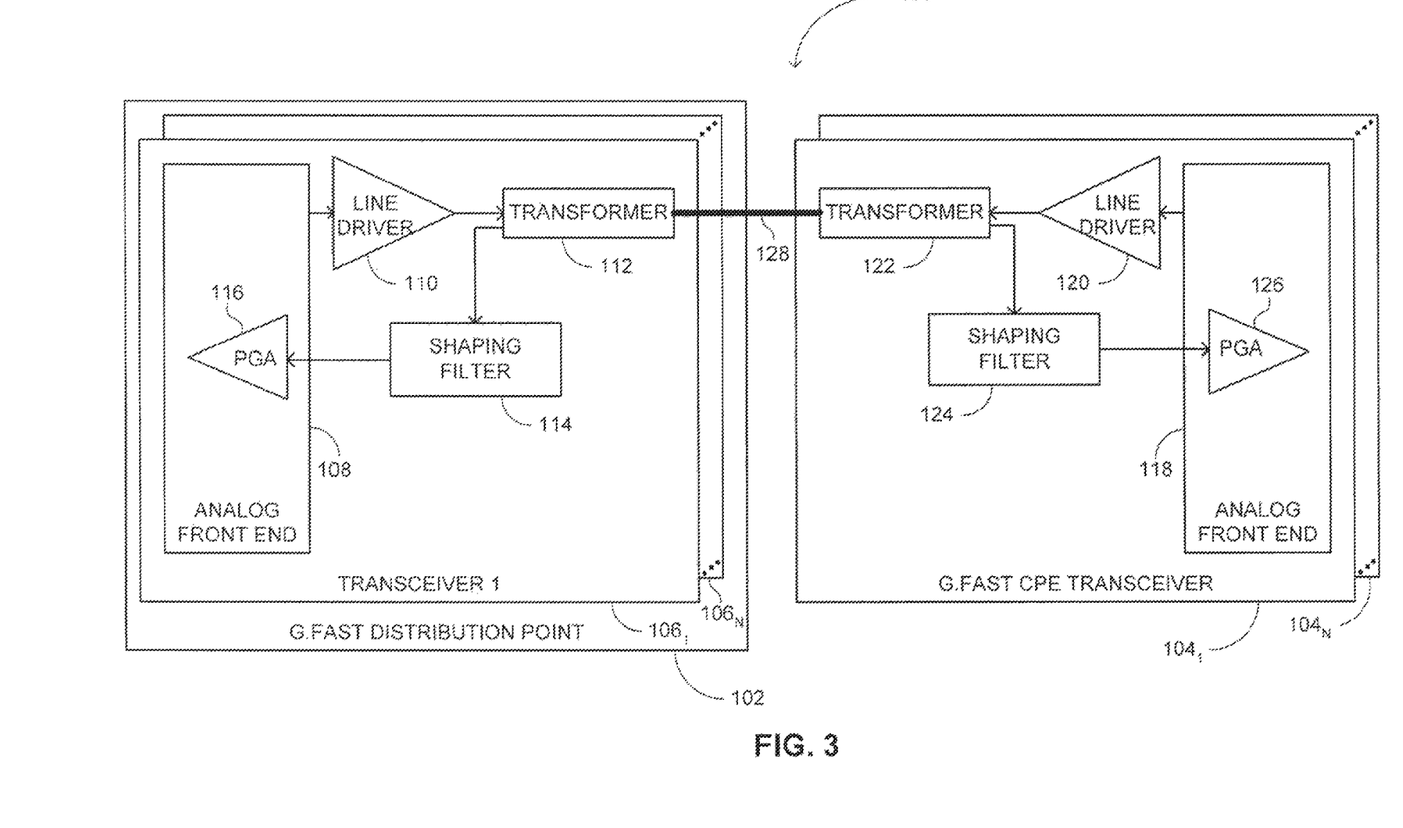
FIG. 3 a schematic illustration of an exemplary G.Fast transmission system constructed and operative in accordance with an embodiment of the disclosed technique.

Reference is now made to FIG. 3, which is a schematic illustration of an exemplary G.Fast transmission system generally referenced 100, constructed and operative in accordance with an embodiment of the disclosed technique. System 100 includes a G.Fast distribution point 102 and a plurality of CPE transceivers $104_1$-$104_N$. For the purpose of simplicity of explanation the following description of FIG. 2 shall relate only to one transceiver CPE $104_1$. However, the explanations relate to all CPE transceivers in the G.Fast communication system. G.Fast distribution point 102 includes a plurality of transceivers $106_1$-$106_N$. For the purpose of simplicity of explanation the following description of FIG. 2 shall relate only to one transceiver $106_1$. However, the explanation relates to all transceivers in the G.Fast communication system. Transceiver $106_1$ includes an Analog Front End (AFE) 108 a transformer 112 and a shaping filter 114. Transceiver $106_1$ optionally includes a line driver 110. Line drive 110 may be located in AFE 108.

AFE 108 includes a Programmable Gain Amplifier (PGA) 116. CPE transceiver $104_1$ includes an AFE 118, a transformer 122 and a shaping filter 124. AFE 118 includes a PGA 126. CPE transceiver $104_1$ optionally includes a line driver 120. Line driver 120 may be located in AFE 118. AFE 108 is coupled with transformer 112. When transceiver $106_1$ includes line driver 110, line drive 110 is coupled between AFE 108 and transformer 112. Filter 114 is coupled with transformer 112 and with PGA 116. AFE 118 is coupled with transformer 122. When CPE transceiver $104_1$ includes line driver 120, line drive 120 is coupled between AFE 108 and transformer 112. Filter 124 is coupled with transformer 122 and with PGA 126. Transformer 112 and transformer 122 are coupled therebetween via a communication channel 128 such as a twisted pair.

During downstream transmission, AFE 108 receives a stream of symbols to be transmitted (e.g., in the form of analog In-phase and Quadrature-phase values), modulates these symbols and optionally up-converts the symbols. AFE 108 provides the modulated symbols to line driver 110. Line driver 110 amplifies the modulated symbols thereby generating a transmit signal to be transmitted to CPE transceiver $104_1$ over channel 128 via transformers 112 and 122. CPE transceiver $104_1$ receivers the transmitted signal and provides the received signal to Filter 124. The attenuation of shaping filter 124 in the overlapping frequency range is higher than the attenuation in the non-overlapping frequency range. Filter 124 provides the filtered received signal to PGA 126. Thus, the VDSL signals, which exhibit a higher power level relative to the G.Fast signals, are attenuated and there is no need to reduce the gain of PGA 126. As mentioned above reducing the gain of the G.Fast receiver (i.e., of PGA 126) may result in a lower Signal to Noise Ratio (SNR) levels.

During upstream transmission, AFE 118 receives a stream of symbols to be transmitted (e.g., in the form of analog In-phase and Quadrature-phase values), modulates these symbols and optionally up coverts the symbols. AFE 118 provides the modulated symbols to line driver 120. Line driver 120 amplifies the modulated symbols thereby generating a transmit signal to be transmitted to transceiver $106_1$ over channel 128 via transformers 122 and 112. Transceiver $106_1$ receives the transmitted signal and provides the received signal to Filter 114. Similar to filter 124, the attenuation of shaping filter 114 in the overlapping frequency range is higher than the attenuation in the non-overlapping frequency range. Filter 124 provides the filtered received signal to PGA 116. Thus, the VDSL signals, which exhibit a higher power relative to the G.Fast signals, are attenuated and there is no need to reduce the gain of PGA 116. An exemplary implementation and the frequency response of shaping filter 114 and shaping filter 124 are elaborated herein in conjunction with FIGS. 4A-4D.

Figure 4A:
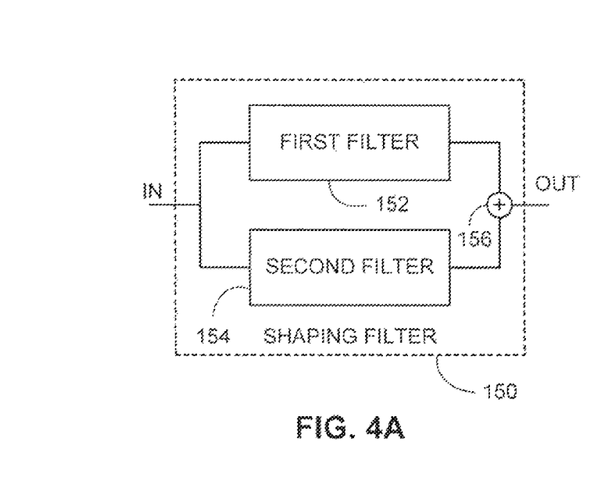
FIGS. 4A, 4B, 4C and 4D are schematic illustration of an exemplary implementation of a shaping filter and of graphs of respective frequency responses in accordance with another embodiment of the disclosed technique.
Figure 4B:
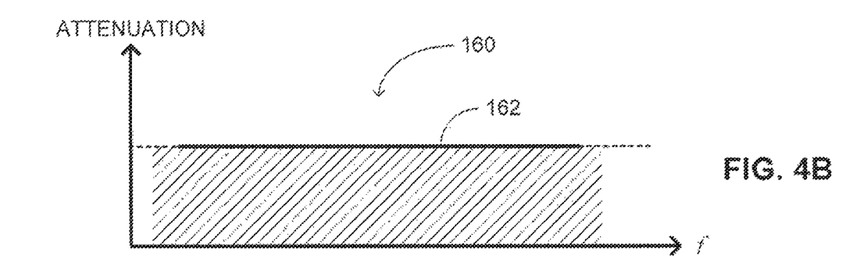
Figure 4C:
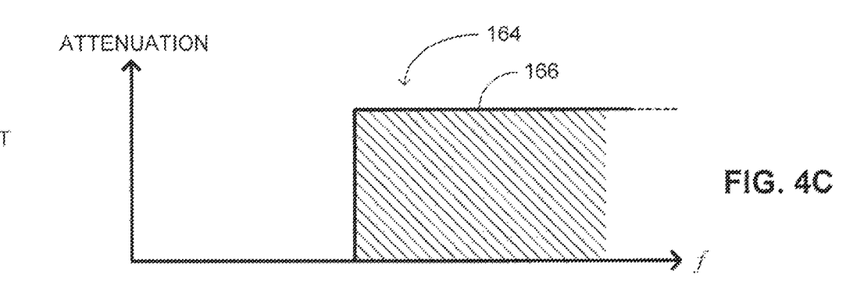
Figure 4D:
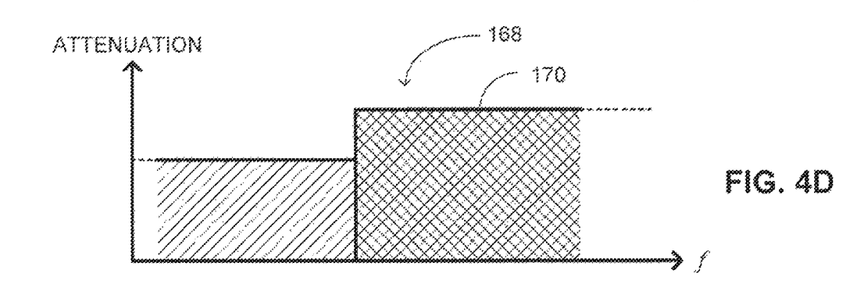

Reference is now made to FIGS. 4A, 4B, 4C and 4D. FIG. 4A is a schematic illustration of an exemplary implementation of a shaping filter, generally referenced 150, constructed and operative in accordance with another embodiment of the disclosed technique. FIGS. 4B, 4C and 4D are schematic illustration of graphs, 160, 164 and 168 respectively, of respective frequency response 162, 166 and 170 also in accordance with another embodiment of the disclosed technique.

With Reference to FIG. 4A, Filter 150 includes a first filter 152, a second filter 154 and a summer 156. The input of first filter 152 and the input of second filter 154 are both coupled with the input of filter 150, demarked 'IN' in FIG. 4A. The output of first filter 152 and input of second filter 154 are both coupled with the inputs of summer 156. The output of summer 156 is coupled with the output of filter 150, demarked 'OUT' in FIG. 4A. First filter 152 exhibits a uniform frequency response similar to frequency response 162 (FIG. 4B). Alternatively, first filter 125 may exhibit a low pass frequency response. Second filter 154 exhibits a high pass frequency response similar to frequency response 166 (FIG. 4C). When first filter 152 exhibits a low pass frequency response, the high cutoff frequency of first filter 152 is higher than the low cutoff frequency of second filter 154. Also, the level of attenuation of second filter 154 in the pass band thereof is less than the level of attenuation of first filter 152 (i.e., also in the pass band thereof). In other words, at the pass band, second filter 154 attenuates the signal less than first filter 152. The output signals from first filter 152 and the output signals from second filter 154, summed by summer 156. The resulting signal shall exhibit a frequency response similar to frequency response 170. As such, the low frequencies are attenuated less than the high frequencies. The high frequencies are defined herein above and below as frequencies which are above the G.Fast transition frequency (i.e., $f_4$ in FIG. 2) and low frequencies are defined herein above and below as frequencies below G.Fast transition frequency.

A shaping filter, such as shaping amplifier 150, may be employed also with the G.Fast communication system regardless if VDSL cross-talk exists or not. In general, as mentioned above, the G.Fast channel exhibits low pass characteristics. Thus, a shaping filter shall pre-condition the received signal according to the channel response. This filter also protects the receiver in case of power peaks in the channel. As such, the high frequencies are defined as frequencies which are above the mask transition frequency and low frequencies are defined as frequencies below mask transition frequencies. Also a shaping filter such as shaping filter 150 may employed in any mode of operation of the system (i.e., overlapping mode, non-overlapping mode or dynamic non-overlapping mode). In other words, the disclosed technique enables employing the same hardware for the various conditions explained herein (e.g., VDSL cross-talk exists or not or for the various modes of operation) and transitions therebetween.

As mentioned above, a G.Fast communication system employs DMT where the available band width is divided into a plurality of sub-channels and determines the modulation scheme for each sub-channel (e.g., Quadrature Amplitude Modulation—QAM) such that the data transmission rate is maximized. In some case, the G.Fast communication system may refrain from using certain sub-channel, for example, when the SNR in a sub-channel decreases below a threshold (e.g., lower than 10 decibels, lower than 5 decibels). According to a further embodiment of the disclosed technique and as mentioned above, the G.Fast communication system employs the VDSL downstream frequency bands during downstream transmission while refraining from employing the VDSL upstream frequency bands. Furthermore, the G.Fast communication system employs the VDSL upstream frequency bands during upstream transmission while refraining from employing the VDSL downstream frequency bands.

Figure 5:
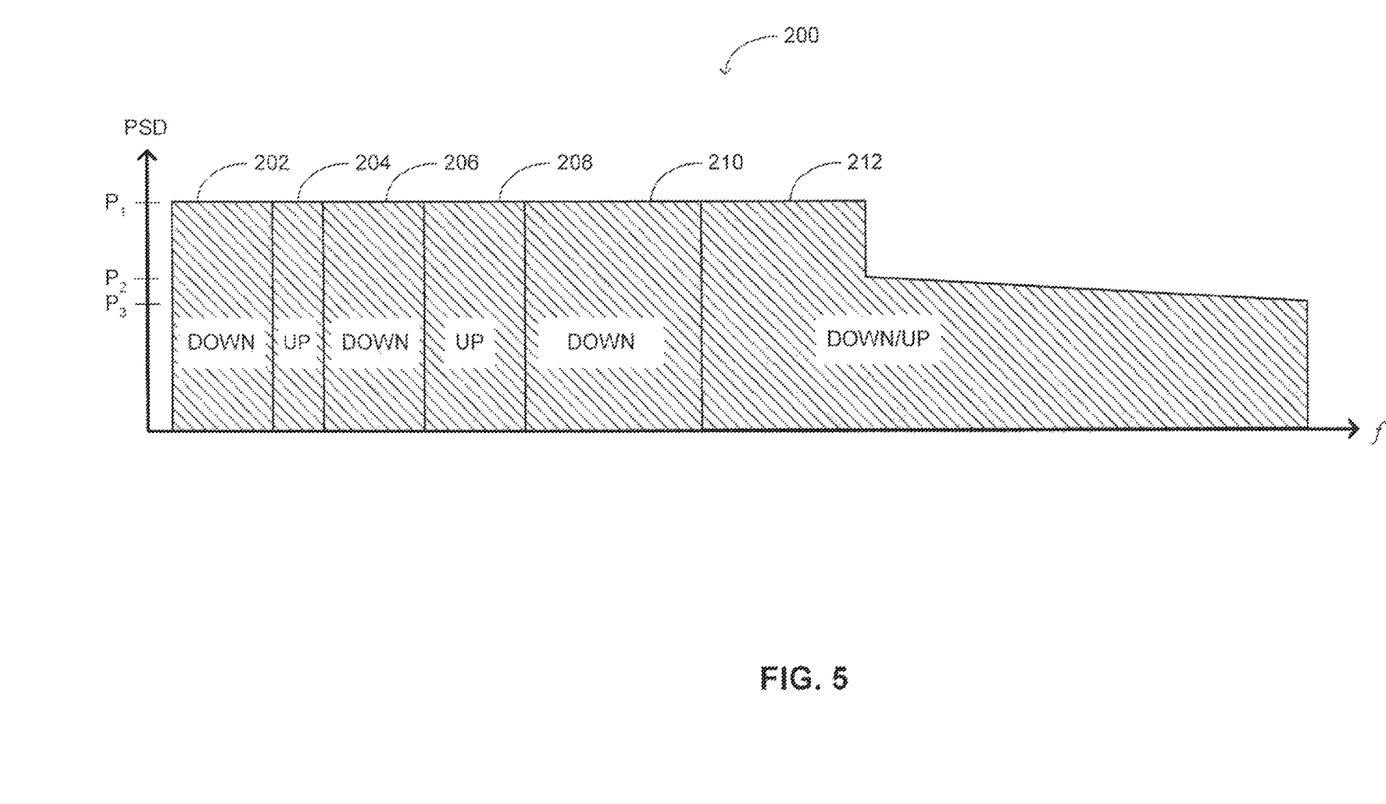
FIG. 5 is a schematic illustration of a G.Fast spectral mask in accordance with a further embodiment of the disclosed technique.

Reference is now made FIG. 5, which is a schematic illustration of a G.Fast spectral mask, generally referenced 200, in accordance with a further embodiment of the disclosed technique. As depicted in FIG. 5, a G.Fast communication system (e.g., G.Fast communication system 100—FIG. 3) employs frequency bands 202, 206 and 210, which correspond to the VDSL downstream frequency bands, during the downstream transmission. However, the G.Fast communication system refrains from employing frequency bands 204 and 208, which correspond to the VDSL upstream frequency bands, during downstream transmission. Conversely, during the upstream transmission, the G.Fast communication system employs frequency bands 208 and 210, which correspond to the VDSL upstream frequency bands, while refraining from employing frequency bands 202, 206 and 210 (i.e., which correspond to the VDSL upstream frequency bands).

It will be appreciated by persons skilled in the art that the disclosed technique is not limited to what has been particularly shown and described hereinabove. Rather the scope of the disclosed technique is defined only by the claims, which follow.

The invention claimed is:

1. A communication system employing a respective plurality of communication channels, said communication channels being susceptible to crosstalk from at least another communication system different from said communication system, said at least other communication system employing a respective plurality of communication channels, said communication system and said at least other communication system exhibiting an overlapping frequency range, said communication system operating in one of overlapping mode and non-overlapping mode, said communication system comprising:
   at least one transceiver pair, at least a first transceiver of said transceiver pair including:
      a first analog front end, receiving a stream of symbols to be transmitted, said first analog front end at least including a programmable gain amplifier; and
      a first shaping filter coupled with said first analog front end, an attenuation of said first shaping filter in said overlapping frequency range is higher than an attenuation of said first shaping filter in the non-overlapping frequency range.

2. The communication system according to claim 1, wherein said first shaping filter includes a first filter in parallel with a second filter, said first filter exhibits one of a uniform frequency response and a low pass frequency response, said second filter exhibits a high pass frequency response, and
   wherein the pass band attenuation of said first shaping filter is higher than the pass band attenuation of said second filter.

3. The communication system according to claim 1, wherein said second transceiver of said transceiver pair including:
   a second analog front end, receiving a stream of symbols to be transmitted, said first analog front end at least including a programmable gain amplifier;
   a second shaping filter coupled with said second analog front end, the attenuation of said second shaping filter in the overlapping frequency range is higher than the attenuation in the non-overlapping frequency range.

4. The communication system according to claim 3, wherein said first transceiver further including a first line driver coupled with said first analog front end and with said second shaping filter, said first line driver being for amplifying symbols.

5. The communication system according to claim 3, wherein said second transceiver further including a second line driver coupled with said second analog front and with said first shaping filter, said second line driver being for amplifying symbols.

6. The communication system according to claim 3, wherein said second shaping filter includes a first filter in parallel with a second filter, said first filter exhibits one of a uniform frequency response and a low pass frequency response, said second filter exhibits a high pass frequency response, and
   wherein the pass band attenuation of said first filter is higher than the pass band attenuation of said second filter.

7. The communication system according to claim 6, wherein data transmission in said communication system is divided into data frames, where each frame includes a plurality of time-slots each for transmitting a data symbol, a portion of the symbols are designated for downlink transmission and another portion of the symbols are designated for uplink transmission, were the ratio of downlink time-slots and uplink time-slots is determined such that the cross-talk from said communication system into said other communication system signals exhibit stationary statistical characteristics.

8. The communication system according to claim 6, wherein when said communication system employs frequency division duplexing where a portion of overlapping frequencies are employed for downstream transmission and another portion is employed for upstream transmission, said communication system employs said portion of overlapping frequencies for downstream transmission.

9. The communication system according to claim 6, wherein when said communication system employs frequency division duplexing where a portion of overlapping frequencies are employed for downstream transmission and another portion is employed for upstream transmission, said communication system employs said portion of overlapping frequencies for upstream transmission.

10. The communication system according to claim 1, wherein each transceiver pair defining a downlink between said first transceiver and a second transceiver and further defining an uplink between said second transceiver and said first transceiver.

11. The communication system according to claim 1 wherein said system operates in overlapping mode.

12. The communication system according to claim 1 wherein said communication system operates in overlapping mode when said other communication system is not-active, and
   wherein said communication system operates in non-overlapping mode when said other communication system is active.

13. The communication system according to claim 12, wherein said non-overlapping mode is dynamic.

* * * * *